(12) United States Patent  
Heise

(10) Patent No.: US 8,927,129 B2  
(45) Date of Patent: Jan. 6, 2015

(54) INTERCONNECTION-LESS LIQUID FIN DESIGN FOR BATTERY COOLING MODULE

(75) Inventor: Axel Heise, Mainz (DE)

(73) Assignee: GM Global Technology Operations LLC, Detroit, MI (US)

( * ) Notice: Subject to any disclaimer, the term of this patent is extended or adjusted under 35 U.S.C. 154(b) by 343 days.

(21) Appl. No.: 13/235,557

(22) Filed: Sep. 19, 2011

(65) Prior Publication Data

US 2013/0071699 A1    Mar. 21, 2013

(51) Int. Cl.
| | |
|---|---|
| *H01M 2/12* | (2006.01) |
| *H01M 10/613* | (2014.01) |
| *H01M 10/6556* | (2014.01) |
| *H01M 10/6554* | (2014.01) |
| *H01M 10/647* | (2014.01) |
| *H01M 10/6551* | (2014.01) |
| *H01M 10/6567* | (2014.01) |
| *H01M 6/50* | (2006.01) |
| *H01M 10/65* | (2014.01) |

(52) U.S. Cl.
CPC ...... *H01M 10/5004* (2013.01); *H01M 10/5057* (2013.01); *H01M 10/5053* (2013.01); *H01M 10/5032* (2013.01); *H01M 10/5046* (2013.01); *H01M 10/5075* (2013.01); *H01M 6/5038* (2013.01); *H01M 10/5034* (2013.01)
USPC ............ 429/88; 429/71; 429/72; 429/99; 429/120; 429/129; 429/148; 429/149; 429/210

(58) Field of Classification Search
CPC ............ H01M 10/5004; H01M 10/5032; H01M 10/5046; H01M 10/5075; H01M 10/5034; H01M 10/5053; H01M 10/5057
USPC ........... 429/71, 72, 88, 89, 99, 120, 129, 148, 429/149, 210
See application file for complete search history.

(56) References Cited

U.S. PATENT DOCUMENTS

| | | | |
|---|---|---|---|
| 2003/0186106 A1 | 10/2003 | Frank et al. | |
| 2005/0064272 A1* | 3/2005 | Frank et al. | .................. 429/38 |
| 2007/0006996 A1* | 1/2007 | Mikubo et al. | ............ 165/104.33 |
| 2007/0259258 A1* | 11/2007 | Buck | ............................ 429/120 |
| 2009/0325054 A1* | 12/2009 | Payne et al. | .................. 429/120 |
| 2012/0107649 A1* | 5/2012 | Anderson et al. | ............... 429/50 |

FOREIGN PATENT DOCUMENTS

CN           102057531 A        5/2011

* cited by examiner

*Primary Examiner* — Patrick Ryan  
*Assistant Examiner* — Ben Lewis  
(74) *Attorney, Agent, or Firm* — Dinsmore & Shohl LLP

(57) ABSTRACT

A battery module is described. The battery module includes a plurality of cooling fins having an inlet section, a center section, and an outlet section, the inlet and outlet sections extending from opposite ends of the center section at an angle from a plane defined by the center section, the cooling fins having at least one cooling channel extending from an inlet of the inlet section through the center section to an outlet of the outlet section; and a plurality of battery cells positioned in the center section between the plurality of cooling fins. A method of cooling a battery module is also described.

20 Claims, 4 Drawing Sheets

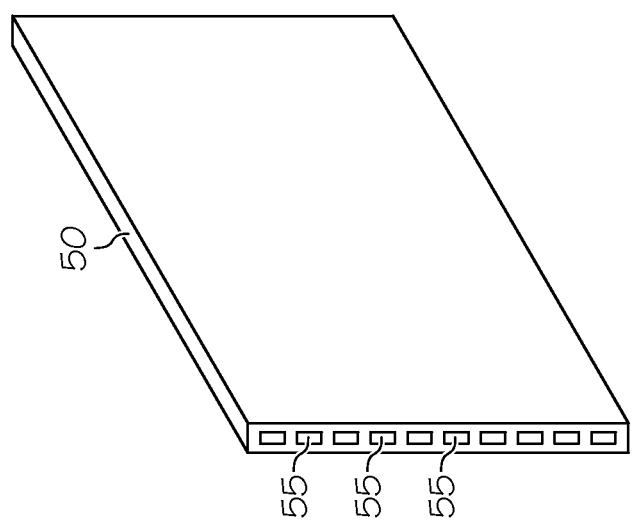

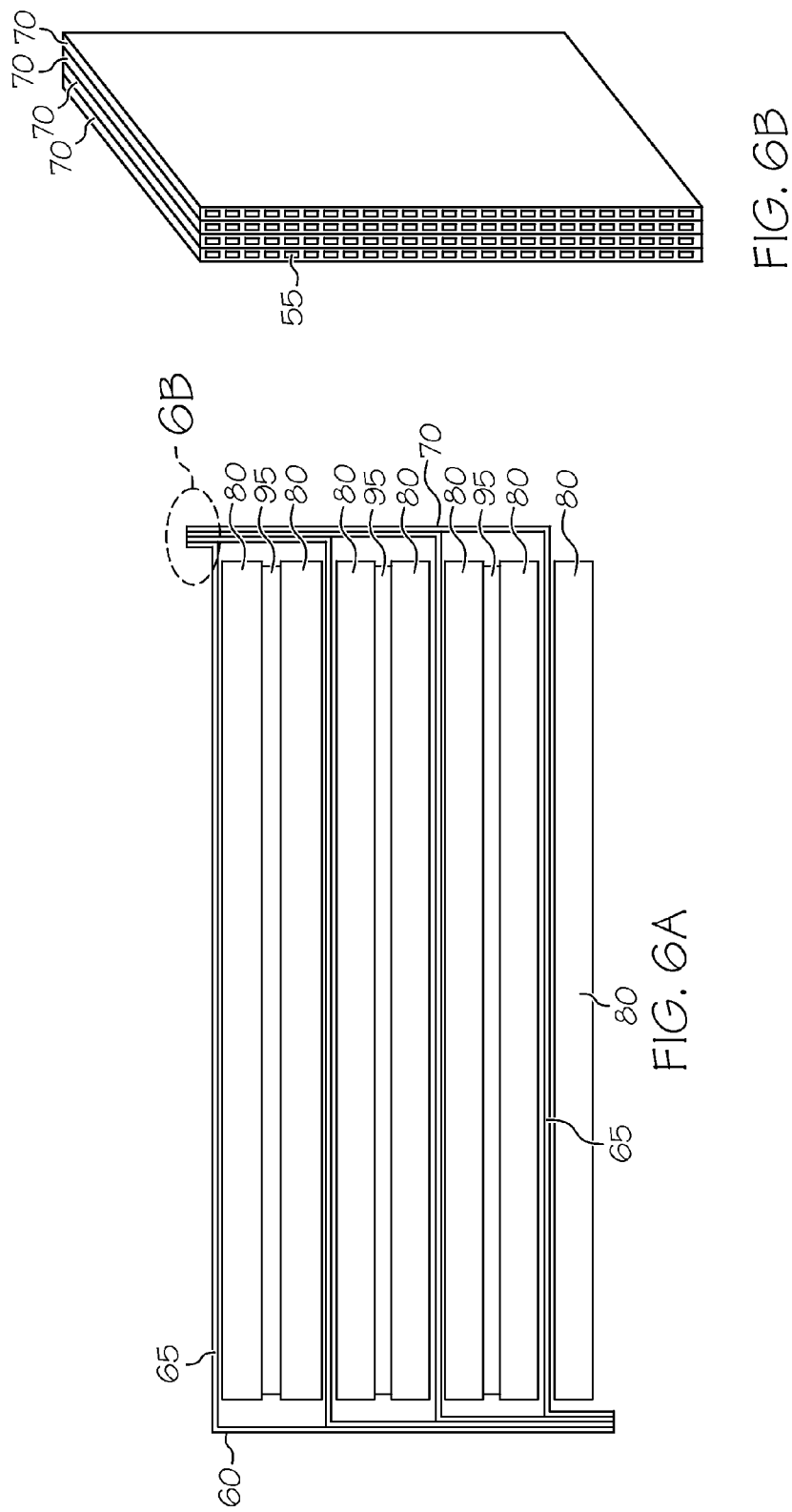

INTERCONNECTION-LESS LIQUID FIN DESIGN FOR BATTERY COOLING MODULE

FIELD OF THE INVENTION

This invention relates generally to batteries, and more particularly to a battery thermal system with improved heat transfer efficiency.

BACKGROUND OF THE INVENTION

Current battery internal heat exchangers require numerous components and sealing connections, and complicated manufacturing processes. One known method for cooling battery cells is to bring two cells into face contact with a cooling fin through which coolant flows. The cooling fins are connected by integrating an inlet and outlet header hole on both sides (or both on one side) of the fin. The inlet and outlet headers are then formed by stacking two or more fins together, and connecting the inlet and outlet header holes. An o-ring seal (or similar seal) may be used to form the seal between two fins. The seals for both inlet and outlet are typically integrated into a frame, which holds the cells and fins in place in the stack.

An example of this type of system is shown in FIG. 1. An expanded view of the battery pack 10 is shown. The battery cells 15 are separated by cooling fins 20. There is a cooling inlet 25 on one side of the cooling fin 20 and a cooling outlet 30 on the other side of the cooling fin 20. Coolant flows through channels 35 in the cooling fin 15. Heat from the battery cells 15 is conducted into the cooling fins 20. Two battery cells 15 and a cooling fin 20 can be contained in a frame 40. There are seals 45 on both sides of the cooling fin 15 for the cooling inlet 25 and cooling outlet 30. The seals 45 can be integrated into the frame 40. This arrangement requires multiple components and seals and a complicated assembly process.

SUMMARY OF THE INVENTION

One aspect of the invention is a battery module. In one embodiment, the battery module includes a plurality of cooling fins having an inlet section, a center section, and an outlet section, the inlet and outlet sections extending from opposite ends of the center section at an angle from a plane defined by the center section, the cooling fins having at least one cooling channel extending from an inlet of the inlet section through the center section to an outlet of the outlet section; and a plurality of battery cells positioned in the center section between the plurality of cooling fins.

Another aspect of the invention is a method of cooling a battery module. In one embodiment, the method includes providing a battery module including a plurality of cooling fins having an inlet section, a center section, and an outlet section, the inlet and outlet sections extending from opposite ends of the center section at an angle from a plane defined by the center section, the cooling fins having at least one cooling channel extending from an inlet of the inlet section through the center section to an outlet of the outlet section; and a plurality of battery cells positioned in the center section between the plurality of cooling fins; connecting the at least one cooling channel to an inlet manifold at an inlet end and to an outlet manifold at an outlet end; and circulating cooling fluid through the at least one cooling channel.

BRIEF DESCRIPTION OF THE DRAWINGS

FIG. 2 is an illustration of one embodiment of a cooling fin of the present invention before being formed into the shape for use.

FIG. 6A is illustration of another embodiment of a battery module containing the cooling fin of the present invention.

FIG. 6B is an illustration of the edge of the cooling fins to be connected to the source of cooling fluid.

DETAILED DESCRIPTION OF THE INVENTIONS

The new design provides a simple, more robust battery internal heat exchanger which improves cooling efficiency, reduces cost, improves reliability, and simplifies manufacturing.

The cooling fin design allows simplification of the battery internal heat exchanger. The cooling fin has one or more cooling channels, and is shaped to allow easy connection outside the battery module to the coolant supply. The coolant interfaces (inlet and outlet) are located outside the battery module, resulting in fewer seals with the present design and lower potential for leakage compared with prior art systems.

The battery module design is simple. There are also fewer components in the module because repeating frames are not required between the battery cells (although they could be included, if desired). This allows the battery modules to be smaller.

Manufacturing is easier because the stacking procedure is simple. In addition, only normal cleanliness standards are required because no seals are made during stacking.

Thus, the design provides lower material, manufacturing, and warranty costs.

FIG. 2 shows one embodiment of the cooling fin 50 before being shaped. The cooling fin 50 is flat and has at least one cooling channel 55. There are preferably a plurality of cooling channels. The number will depend on the cooling requirements of the battery module and operating requirements, such as pressure drop.

The cooling fin can be made of any suitable heat conductive material, including, but not limited to metals and plastic. It can be made using any suitable process, including, but not limited to, extrusion or stamping/bonding (for example stamping the cooling channel in a sheet of metal and bonding a second sheet of metal to the stamped sheet). The pressure drop through the channels is definable by the flow field size design, as is known by those of skill in the art. The cooling fins can be made in thicknesses as low as about 1 mm (for example, 0.25 mm sidewall-0.5 mm channel-0.25 mm sidewall). The thickness will depend on the system requirements. The bending radius can be as low a twice the fin thickness, or about 2 mm.

Figure 3:
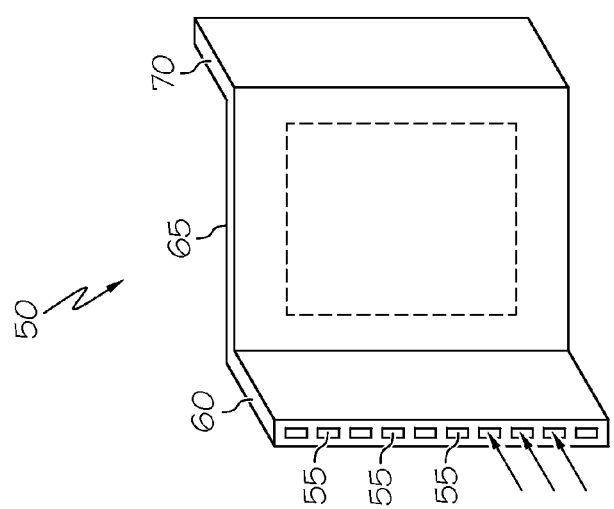
FIG. 3 is an illustration of the embodiment of FIG. 2 after being formed into the shape for use.

FIG. 3 shows the cooling fin 50 bent into its final shape for use. There is an inlet section 60, a center section 65, and an outlet section 70. The inlet and outlet sections 60, 70 are shown as extending in opposite directions from the plane of the center section 65 in FIG. 3 (forming a straight "z" shape). The inlet and outlet sections 60, 70 extend from the plane of the center section 65 at an angle. The angle is desirably about 90°.

The coolant supply will be connected to the inlet of the cooling channels 55 in the inlet section 60. The battery cells will be placed in the center section 65. The coolant return will be connected to the outlet of the coolant channels of the outlet section 70. The coolant flows through the coolant channels 55 from the inlet section 60 to the center section 65 to the outlet section 70.

Figure 4:
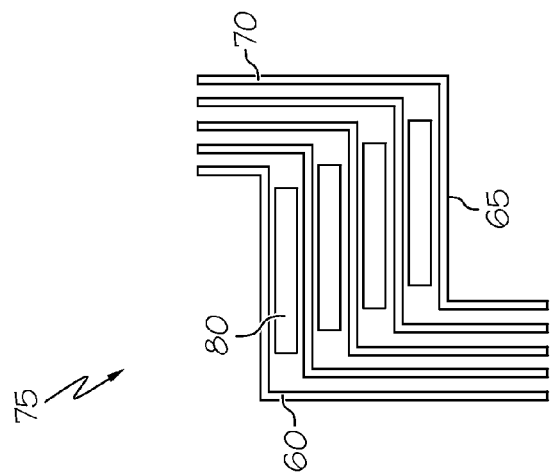
FIG. 4 is an expanded illustration of one embodiment of a battery module containing the cooling fin of the present invention.

FIG. 4 shows an expanded view of one embodiment of a battery module 75. The battery cells 80 are placed between the cooling fins 50. The length of the all of the cooling fins 50 is about the same so that the pressure drop is about the same. The center sections 65 of all of the cooling fins is about the same length. The length of the inlet sections 60 and outlet sections 70 will vary depending on where in the stack the particular cooling fin is located. A cooling fin with a shorter inlet section (closer to the front of the stack) will have a longer outlet section. A cooling fin with a longer inlet section (closer to the back of the stack) will have a shorter outlet section. This arrangement allows the inlets of the all of the inlet sections 60 and the outlets of all of the outlet sections 70 to line up so that they can be attached the inlet and outlet coolant manifolds (not shown).

Figure 1:
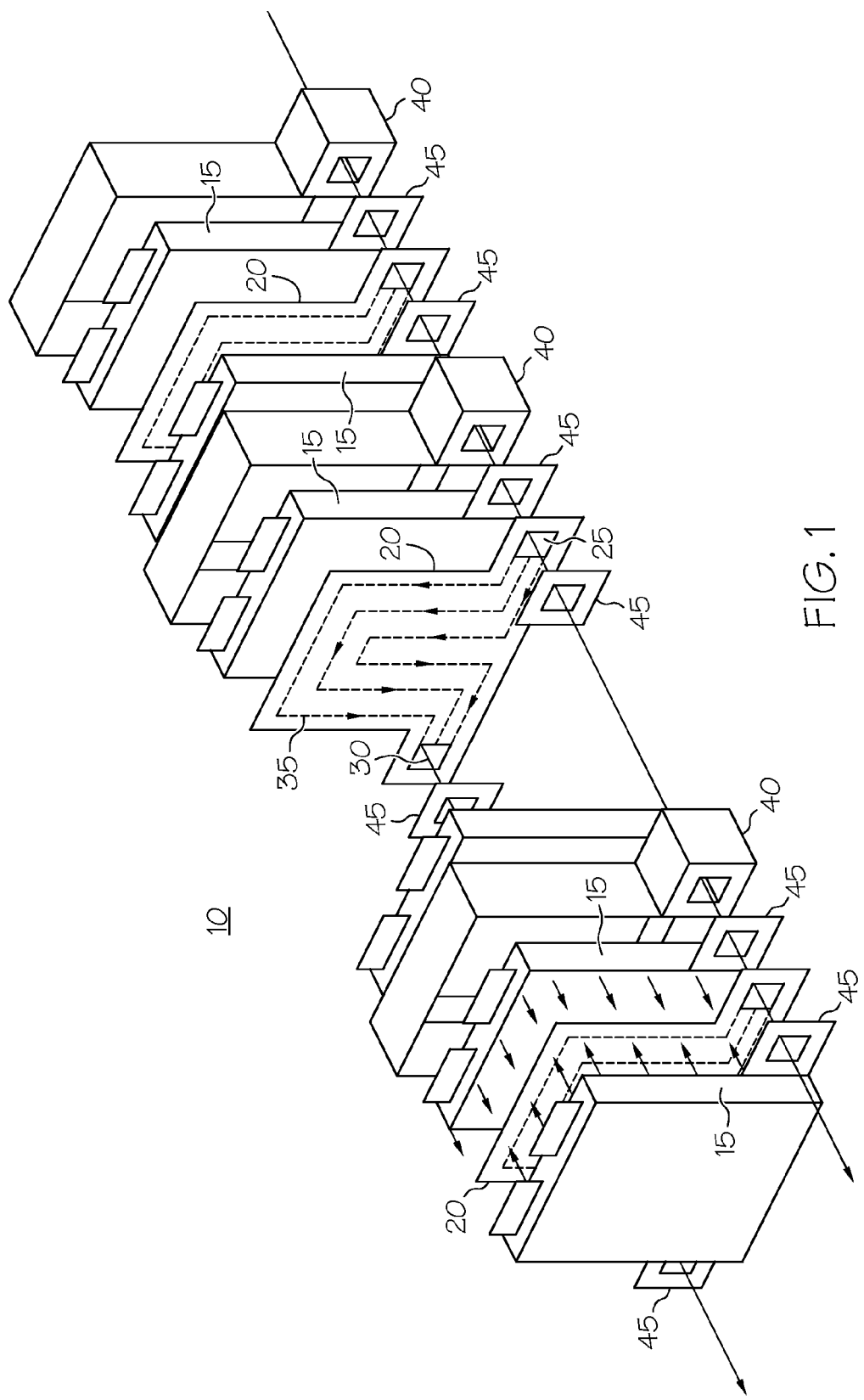
FIG. 1 is an illustration of a prior art method of cooling battery cells.
Figure 5:
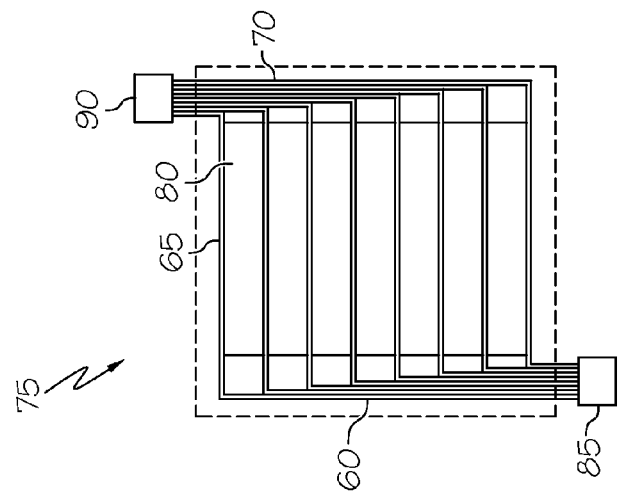
FIG. 5 is an illustration of one embodiment of an assembled battery module containing the cooling fin of the present invention.

FIG. 5 shows an assembled battery module 75. The battery cells 80 are separated by cooling fins 50. The inlet sections 60 and outlet sections 70 are aligned for connection to the coolant inlet and outlet manifolds 85, 90. In this embodiment, each battery cell 80 is between two cooling fins 50 (i.e., cooling fin/battery cell/cooling fin/battery cell/cooling fin etc.). However, other arrangements are possible, such as, arrangements in which there are battery cells every second or third etc. battery cell (i.e., cooling fin/2 battery cells/cooling fin/2 battery cells/cooling fin, etc. or cooling fin/3 battery cells/cooling fin/3 battery cells, cooling fin etc.), etc.

FIG. 6A shows another embodiment of a battery module 75. The battery module 75 has two battery cells 80 positioned between adjacent cooling fins 50. There are expansion units 95 between two adjacent battery cells 80. The expansion units 95 are on the side of the battery cells 80 not facing the cooling fins 50. The expansion units 95 can be for example, a sheet of foam. The expansion unit 95 compensates for the cell tolerance and expansion variation in the cell thickness direction.

FIG. 6B shows the edges of the outlet sections 70 of FIG. 6A (the inlet section would be similar). The cooling channels 55 of the outlet sections 70 will be connected to a coolant manifold.

The battery modules can be assembled by stacking the cooling fins, battery cells, and optional expansion units in the appropriate order, gaging the module, and locking it together at the nominal size. Because there are no internal fluid connections, the assembly is simplified.

The battery module could include repeating frames, if desired, although this is not necessary. The repeating frames typically have an open center, although this is not required. The repeating frames support the battery cells, cooling fins, and optional expansion units. The repeating frames are typically made of a light-weight, non-conductive material. Suitable materials include, but are not limited to, plastics, such as polypropylene, nylon 6-6, and other low cost materials. The repeating frames can be fiber-reinforced for structural strength, if desired.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise an electrochemical conversion assembly or fuel cell, a vehicle incorporating an electrochemical conversion assembly according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A battery module comprising:
a plurality of cooling fins, each of said plurality of cooling fins having three panels formed from a single fin which is bent to create an inlet section, a center section, and an outlet section, the inlet and outlet sections extending from opposite ends of the center section at an angle away from a plane defined by the center section, the cooling fins having at least one cooling channel extending from an inlet of the inlet section through the center section to an outlet of the outlet section; and
a plurality of battery cells positioned in the center section between the plurality of cooling fins.

2. The battery module of claim 1 wherein the inlet and outlet sections extend in opposite directions from the plane.

3. The battery module of claim 1 wherein the angle is about 90°.

4. The battery module of claim 1 wherein there are a plurality of cooling channels in each cooling fin.

5. The battery module of claim 1 further comprising an expansion unit positioned between the battery cells.

6. The battery module of claim 5 wherein the expansion unit is a layer of foam.

7. The battery module of claim 1 wherein the inlets and outlets of the plurality of cooling fins are aligned.

8. The battery module of claim 1 wherein the cooling fin is about 1 mm thick.

9. The battery module of claim 1 wherein a bending radius of the cooling fin is about 2 mm.

10. A battery module comprising:
a plurality of cooling fins wherein each cooling fin comprises three panels formed from a single fin which is bent to create an inlet section, a center section, and an outlet section, the inlet and outlet sections extending from opposite ends of the center section at an angle of about 90° away from a plane defined by the center section, the cooling fins having a plurality of cooling channels extending from an inlet of the inlet section through the center section to an outlet of the outlet section wherein the inlets and outlets of the plurality of cooling fins are aligned; and a plurality of battery cells positioned in the center section between the plurality of cooling fins.

11. The battery module of claim 10 further comprising an expansion unit positioned between the battery cells.

12. A method of cooling a battery module comprising: providing a battery module comprising:
- a plurality of cooling fins having three panels formed from a single fin which is bent to create an inlet section, a center section, and an outlet section, the inlet and outlet sections extending from opposite ends of the center section at an angle away from a plane defined by the center section to form a straight "z" shape, the cooling fins having at least one cooling channel extending from an inlet of the inlet section through the center section to an outlet of the outlet section; and
- a plurality of battery cells positioned in the center section between the plurality of cooling fins;

connecting the at least one cooling channel to an inlet manifold at an inlet end and to an outlet manifold at an outlet end; and circulating cooling fluid through the at least one cooling channel.

13. The method of claim 12 wherein the inlet and outlet sections extend in opposite directions from the plane.

14. The method of claim 12 wherein the angle is about 90°.

15. The method of claim 12 wherein there are a plurality of cooling channels.

16. The method of claim 12 further comprising an expansion unit positioned between the battery cells.

17. The method of claim 16 wherein the expansion unit is a layer of foam.

18. The method of claim 12 wherein the inlet and outlet ends of the plurality of the cooling fins are aligned.

19. The method of claim 12 wherein the cooling fin is about 1 mm thick.

20. The method of claim 12 wherein a bending radius of the cooling fin is about 2 mm.

* * * * *